United States Patent
Wren

(10) Patent No.: US 7,668,788 B2
(45) Date of Patent: Feb. 23, 2010

(54) RESOURCE ASSIGNMENT OPTIMIZATION USING DIRECT ENCODING AND GENETIC ALGORITHMS

(76) Inventor: William E. Wren, 7201 Aspen Rd., Princeton, MN (US) 55371

(*) Notice: Subject to any disclaimer, the term of this patent is extended or adjusted under 35 U.S.C. 154(b) by 145 days.

(21) Appl. No.: 11/370,698

(22) Filed: Mar. 8, 2006

(65) Prior Publication Data

US 2007/0005522 A1  Jan. 4, 2007

Related U.S. Application Data

(60) Provisional application No. 60/687,750, filed on Jun. 6, 2005.

(51) Int. Cl.
*G06N 3/12* (2006.01)

(52) U.S. Cl. .............................. 706/13; 706/12; 706/14; 700/28; 700/90; 700/99; 700/100; 700/101; 700/102

(58) Field of Classification Search ............. 706/12–14; 705/8; 700/28–34, 90, 99, 101, 104
See application file for complete search history.

(56) References Cited

U.S. PATENT DOCUMENTS

| | | | | |
|---|---|---|---|---|
| 5,319,781 A * | 6/1994 | Syswerda | ........................ | 705/8 |
| 5,471,408 A * | 11/1995 | Takamoto et al. | .............. | 703/2 |
| 5,848,403 A | 12/1998 | Gabriner et al. | ................ | 706/13 |
| 5,897,629 A * | 4/1999 | Shinagawa et al. | ............ | 706/13 |
| 5,943,652 A * | 8/1999 | Sisley et al. | ...................... | 705/9 |
| 6,233,493 B1 | 5/2001 | Cherneff et al. | ............... | 700/95 |
| 6,662,167 B1 * | 12/2003 | Xiao | ............................ | 706/13 |
| 7,246,075 B1 * | 7/2007 | Testa | .............................. | 705/8 |
| 2003/0161463 A1 * | 8/2003 | Galvin | ................... | 379/265.01 |
| 2004/0059621 A1 * | 3/2004 | Jameson | ........................ | 705/8 |
| 2004/0165716 A1 * | 8/2004 | Galvin | .................. | 379/265.02 |
| 2004/0254901 A1 * | 12/2004 | Bonabeau et al. | ............. | 706/13 |
| 2005/0044052 A1 * | 2/2005 | Zhu | ............................ | 706/13 |
| 2005/0080979 A1 * | 4/2005 | Wu et al. | ........................ | 711/1 |
| 2005/0097559 A1 * | 5/2005 | He | .............................. | 718/104 |
| 2008/0027769 A1 * | 1/2008 | Eder | .............................. | 705/7 |
| 2009/0030771 A1 * | 1/2009 | Eder | ............................ | 705/10 |

OTHER PUBLICATIONS

Falkenauer et al. "A Genetic Algorithm for Job Shop", Proceedings of the 1991 IEEE International Conference of Robotics and Automation, 1991, pp. 824-829.*

* cited by examiner

*Primary Examiner*—David R Vincent
*Assistant Examiner*—Omar F Fernandez Rivas
(74) *Attorney, Agent, or Firm*—Mark A. Litman & Associates, PA

(57) ABSTRACT

This invention provides a means to minimize the costs of technical and business processes. These processes are comprised of resources and tasks requiring resources. The optimization consists of the best assignment of resources to tasks to minimize the costs. In the resource assignment optimization method disclosed herein, Genetically Adapted Search Agents (GASA) are employed to improve a population of possible assignments, each represented by a single variable length chromosome, where the chromosome upon which the GASA operates is a direct encoding of possible resource to task assignments and order. To manage the enlarged search space, this method uses the GASA with substring crossover to evolve the population towards better solutions. The assignments generated by this method satisfy all constraints.

16 Claims, 5 Drawing Sheets

FIGURE 1 – Classic Genetic Algorithm (CGA)
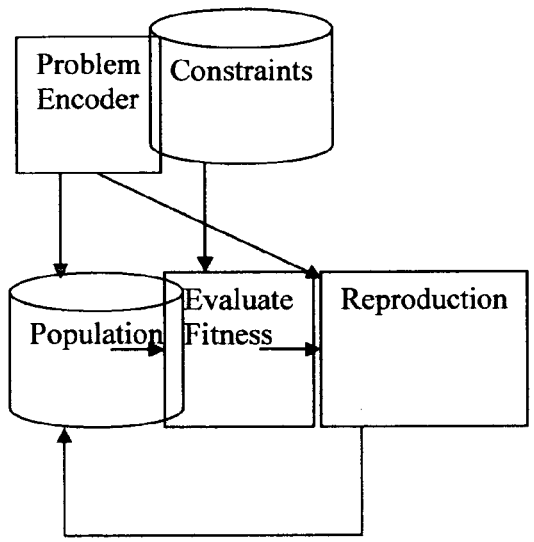
FIGURE 2A An Encoded Chromosome With All Resources Assigned
| Task | Resource | Sequence | |
|------|----------|----------|---|
| 1 | 6 | 1 | |
| 1 | 2 | 1 | |
| 2 | 2 | 2 | ⎫ 3 resources assigned to task 2 |
| 2 | 3 | 0 | ⎬ |
| 2 | 1 | 2 | ⎭ Task 2 requires from 1 to 3 |
| 3 | 6 | 0 | resources |
| 4 | 4 | 4 | |
| 4 | 2 | 0 | Chromosome length = N |
| 4 | 5 | 0 | |
| * | * | * | |
| * | * | * | |

FIGURE 2B An Encoded Chromosome With Less Than All Possible Resources Assigned

| Task | Resource | Sequence | |
|------|----------|----------|---|
| 1 | 6 | 1 | |
| 1 | 2 | 1 | |
| 2 | 2 | 2 | ⎫ 2 resources assigned to task 2 |
| 2 | 3 | 0 | ⎬ Task 2 requires from 1 to 3 |
| 3 | 6 | 0 | resources |
| 4 | 4 | 4 | |
| 4 | 2 | 0 | Chromosome length = N-1 |
| 4 | 5 | 0 | |
| * | * | * | |
| * | * | * | |

FIGURE 2C An Encoded Chromosome With All Less Than All Resources Assigned, Using Null Resources

| Task | Resource | Sequence | |
|------|----------|----------|---|
| 1 | 6 | 1 | |
| 1 | 2 | 1 | |
| 2 | 2 | 2 | ⎫ 2 resources assigned to task 2 |
| 2 | 3 | 0 | ⎬ Task 2 requires from 1 to 3 |
| 2 | NULL | NULL | resources |
| 3 | 6 | 0 | |
| 4 | 4 | 4 | Chromosome length = N |
| 4 | 2 | 0 | |
| 4 | 5 | 0 | |
| * | * | * | |
| * | * | * | |

FIGURE 3 – GASA Components
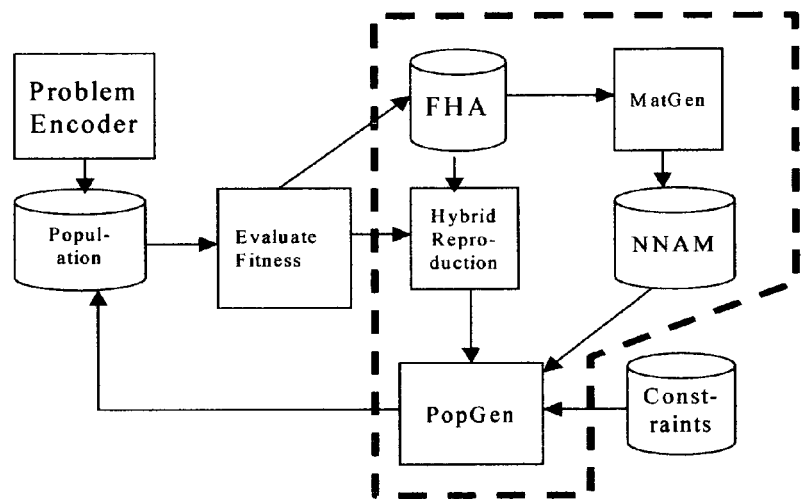
FIGURE 4 GASA Partial Substring Crossover
| Chromosome Position | Chromosome Number | Resource 3 Order | New Chromosome Resource Value | New Chromosome Order Value |
|---|---|---|---|---|
| | 4 | 2 | 3 | 2 |
| | 4 | 0 | 3 | 0 |
| | 4 | 1 | 3 | 1 |
| | 3 | 8 | 3 | 8 |
| | 3 | 7 | 3 | 7 |
| | 3 | 5 | 3 | 5 |
| | 3 | 6 | 3 | 6 |
Partial Chromosome tuple values FIGURE 5 – Example of Near Neighbor Attribute Matrix (NNAM) at Start Of optimization.
Current Task for Resource 1 = 18.

| NNAM Task Num | Resource1 | Resource2 | Resource3 | ResourceN |
|---|---|---|---|---|
| 1 | Task54 | Task32 | Task89 | Task16 |
| 2 | Task32 | Task54 | Task22 | Task45 |
| 3 | Task201 | Task138 | Task201 | Task2 |
| 4 | Etc.. | Etc.. | Etc.. | Etc.. |
| 5 | Etc… | Etc… | Etc… | Etc… |

FIGURE 6 – Example Of Building a new Near neighbor Attribute Matrix (NNAM).
Current Task = 18

| Original NNAM For Resource 1 | Weighted Scores From FHA Fitnesses | New NNAM For Resource 1 | Notes: |
|---|---|---|---|
| Task54 | 1005 | Task32 | ○ 2003 is the highest score on the example list |
| Task32 | 2003 | Task54 | ○ Typically less than 100 items on each list |
| Task201 | 7 | Task89 | |
| Etc.. | Etc.. | Etc.. | ○ FHA = Fitness History Archive |
| Etc… | Etc… | Etc… | ○ Fitness: bigger is better |

FIGURE 7 – Example of Near Neighbor Attribute Matrix
(NNAM) After Rebuilding According to Fitness.
Current Task for Resource 1 = 18.
| Task Num | Resource1 | Resource2 | Resource3 | ResourceN |
|---|---|---|---|---|
| 1 | Task32 | Task138 | Task201 | Task16 |
| 2 | Task54 | Task54 | Task22 | Task45 |
| 3 | Task89 | Task32 | Task201 | Task2 |
| 4 | Etc.. | Etc.. | Etc.. | Etc.. |
| 5 | Etc… | Etc… | Etc… | Etc… |
FIGURE 8 – Probability Selection Curve For Selecting
The next task for a resource
Task From The NNAM
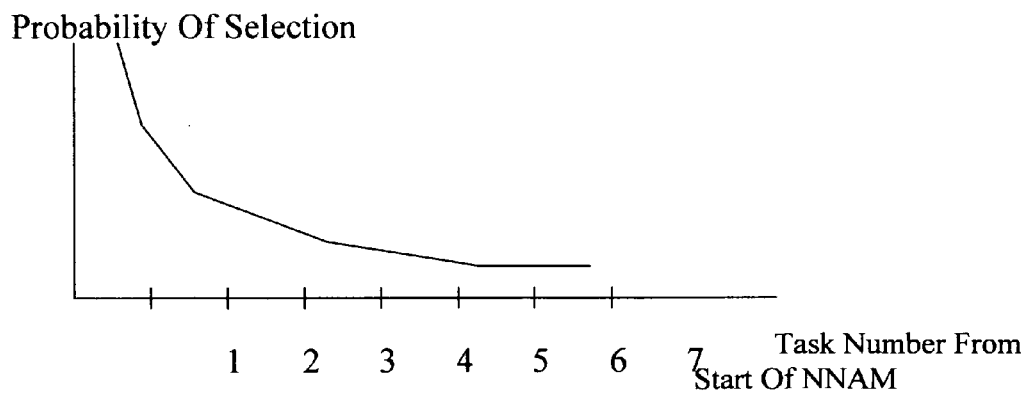

RESOURCE ASSIGNMENT OPTIMIZATION USING DIRECT ENCODING AND GENETIC ALGORITHMS

RELATED APPLICATIONS DATA

The present application claims priority of U.S. Provisional Patent Application Ser. No. 60/687,750, filed Jun. 6, 2005. The contents of which are expressly incorporated herein by reference.

BACKGROUND OF THE INVENTION

1. Field of the Invention

The present invention relates to the field of process and solution improvement, especially solution improvement and facilitation by way of computer based analysis, as by algorithms using genetic algorithms and/or evolution algorithms.

2. Background of the Art

Genetic Algorithms (GA)

The study of genetic algorithms originated with John Holland in the mid-1970s. His original genetic algorithm is approximately the same as the "Simple Genetic Algorithm" now found in the literature. Since this GA is used as a starting point for almost all new work, it is worth describing it in detail.

A simple GA represents solutions using strings of bits. These bits may encode integers, real numbers, sets, or whatever else is appropriate to the problem. Advocates argue that the use of bit-strings as a universal representation allows for a uniform set of simple operators, and simplify the task of analyzing GA properties theoretically. Detractors argue that bitwise operators are often not appropriate for particular problems, and that analytic ease is too high a price to pay for performance. Today, most practical GA systems use problem-specific representations (integers to represent integers, character strings to represent sets, and so on), and customize operations for these representations.

The operators provided by the simple GA were 1-point crossover, mutation, and inversion. These were inspired directly by natural systems. Today, inversion has largely been dropped, and several different forms of crossover and mutation are used.

Selection in the simple GA was based directly on fitness: given a population of individuals, the probability of a particular individual passing its genes into the next generation was directly proportional to its fitness. Various ranking and selection schemes are now used instead of raw fitness in order to ensure that genetic drift does not occur, i.e. that good genes are less likely to disappear because of a bad accident.

As the previous paragraph hinted, simple GA systems use generational update schemes. These are like the life cycles of many plant and insect species: each generation produces the next and then dies off, so that an individual in generation g never has a chance to breed with one in generation g+1. As we shall see, continuous update schemes are also possible, in which children are gradually mixed into a single, continuously-evolving, population.

The simple GA also used a single population, in which any individual could potentially breed with any other. Starting in the 1980s, many groups (including the Edinburgh group) began experimenting with multiple populations because of the availability of parallel computing hardware. Surprisingly, multiple populations turned out to be better in most cases, even when simulated on conventional machines. The reason is that they permit speciation, a process by which different populations evolve in different directions (i.e., toward different optima). This helps maintain the diversity of the total population. One of the strengths of early improvements on Holland's genetic algorithms were their built-in support for multi-population GAs, and the way in which it handles such things as work distribution automatically.

Finally, the simple GA was a weak method. In the optimization community, this term means that it did not use any knowledge about the evaluation function, such as its derivative, to guide its search. Genetic algorithms are therefore particularly well-suited to problems with discontinuous or poorly-behaved evaluation functions.

GA's begin by randomly generating, or seeding, an initial population of candidate solutions. Each candidate is an individual member of a large population of size M. For the purposes of this discussion, think of each individual as a row vector composed of N elements. In GA parlance, individuals are often referred to as chromosomes, and the vector elements as genes. Each gene will provide storage for, and may be associated with, a specific parameter of the search space. As a simple example of two unknowns, we may think of each individual as a parameter vector V, in which the each V contains a point in the x-y plane, V=[x y]. With this example in mind, the entire population may be stored and manipulated as two-column matrix: The first column represents a population of x-axis values, and the second column a population of y-axis values, and each of the M rows of the matrix is a solution vector V of length N=2.

The individuals (chromosomes) in genetic algorithms are usually constant-length character sequences (vectors V of constant size). In the traditional GA, these vectors are usually sequences of zeros and ones, but in practice may be anything, including a mix of integers and real numbers, or even a mix of numbers and character strings. The actual data encoded in the vectors is called the representation scheme. To keep the discussion simple and concrete, the chromosomes in this article will be real, continuous parameters with two elements, V=[x y]. Given these two-element chromosomes, the objective is to search for the (x,y) point that maximizes the scalar-valued fitness function $z=f(V)=f(x,y)$. Starting with the initial random population of vectors, a GA then applies a sequence of operations to the population, guided only by the relative fitness of the individuals, and allows the population to evolve over a number of generations. The goal of the evolutionary process is to continually improve the fitness of the best solution vector, as well as the average population fitness, until some termination criteria is satisfied.

Conventional GAs usually apply a sequence of operations to the population based on the relative fitness of the members. The operations typically involve reproduction, in which individuals are randomly selected to survive into the next generation. In reproduction, highly fit individuals are more likely to be selected than unfit members. The idea behind reproduction is to allow relatively fit members to survive and procreate, with the hope that their genes are truly associated with better performance. Note that reproduction is asexual, in that only a single individual is involved.

The next operation, crossover, is a sexual operation involving two (or even more!) individuals. In crossover, highly fit individuals are more likely to be selected to mate and produce children than unfit members. In this manner, highly fit vectors are allowed to breed, with the hope that they will produce ever more fit offspring. Although the crossover operation may take many forms, it typically involves splitting each parent chromosome at a randomly-selected point within the interior of the chromosome, and rearranging the fragments so as to produce offspring of the same size as the parents. The children usually differ from each other, and are usually different from the parents. The effect of crossover is to build upon the success of the past, yet still explore new areas of the search space. Crossover is a slice-and-dice operation which efficiently shuffles genetic information from one generation the next.

The next operation is mutation, in which individuals are slightly changed. In our case, this means that the (x,y) parameters of the chromosome are slightly perturbed with some small probability. Mutation is an asexual operation, and usually plays a relatively minor role in the population. The idea behind mutation is to restore genetic diversity lost during the application of reproduction and crossover, both of which place relentless pressure on the population to converge.

The relentless pressure towards convergence is driven by fitness, and offers a convenient termination criteria. In fact, after many generations of evolution via the repeated application of reproduction, crossover, and mutation, the individuals in the population will often begin to look alike, so to speak. At this point, the GA typically terminates because additional evolution will produce little improvement in fitness. Many termination criteria may be used, in which the most simple is to just stop after some predetermined number of generations.

Since Holland, other researchers have made progress towards the optimization (e.g., minimizing the dollar cost of a set of operations) of large constrained applications consisting of multiple resources to be assigned in desired sequence to many tasks. This is a very difficult problem. Techniques such as linear programming, other classical mathematical methods, and simple Genetic Algorithms (GA) have been used for relatively simple process optimizations for several applications. The GA so used proceeds from random initial solutions (a population) and uses the GA operations: selection, crossover, mutation, and fitness calculation to increasingly "evolve" towards better populations of solutions. These GA operations work well on certain types of problems, and not so well on others. Of this latter class, large multi resource/multi assignment constrained ordered resource assignment problems are of particular difficulty as they are typically multi chromosomal and contain both Bin Packing (BP) and Traveling Salesmen Problem (TSP) attributes. Even if heuristics are used (e.g. spatially adjacent near neighbors) to prune the search space, constraints can disrupt the new search space and thus nullify any advantage from using ad hoc heuristics.

A method of surmounting GA difficulties has been addressed by U.S. Pat. No. 5,319,781 to G. Syswerda, entitled "Generation of Schedules Using a Genetic Procedure". Syswerda specified a single single-valued chromosome consisting of a permutable task list. As Syswerda noted, his patent was based primarily on the method of problem encoding and the use of a deterministic scheduler, deviating from the simple binary encoding of prior art. In Syswerda, each task is assigned its resources in order from the permuted list by a deterministic scheduling method that resolves all constraints. This method works very well if the number of resources per task is constant. It constrains the search space very efficiently. An example of using this method for an application is referenced in U.S. Pat. No. 6,233,493 to Jonathan Cherneff; in which product development sequences could be optimized using the Syswerda method in part. However, if the number of resources per task is variable e.g., the number of painters assigned to paint a house, than the Syswerda method of using a deterministic method of assigning resources to tasks is insufficient.

To surmount the difficulty of optimization where applications require a variable number of resources per task, this invention uses a different problem encoding method of dual valued chromosomes. Because this invention's encoding method necessarily (i.e., mathematically) enlarges the search space, this invention also uses a new method of reproduction named: Genetically Adapted Search Agents (GASA). The GASA was invented to adaptively narrow the enlarged search space to speed solution convergence. In addition, to avoid the difficulty of using GA crossover whereby illegal solutions may arise, this invention uses GASA methods to avoid illegal crossover.

The present invention is a method of assigning resources to tasks in such a manner as to minimize the cost of the resources required to execute or accomplish the tasks. A particular assignment of resources to tasks is called a chromosome. This invention uses a new method of using genetic algorithms to progressively improve a set of chromosomes, each of which is a solution to a problem that is desired to be optimized.

BRIEF DESCRIPTION OF THE DRAWINGS

The accompanying drawings show a particular embodiment of the invention as an example, and are not intended to limit the scope of the invention. For example, while the invention is shown and described in schematic terms, many aspects of the invention may be performed by varying the software and computing hardware implementations.

FIG. 1 is a schematic diagram of the Classic/Simple Genetic Algorithm (GA), which the invention improves upon.

FIG. 2A is a schematic diagram illustrating a variable length encoded chromosome with all resources assigned FIG. 2B is a schematic diagram illustrating a variable length encoded chromosome with less than the maximum number of resources assigned to a particular type to a task, decreasing the chromosome length.

FIG. 2C is a schematic diagram illustrating a variable length encoded chromosome with less than the maximum number of resources assigned to a particular type to a task, using a NULL resource keeping the chromosome length to its maximum value.

FIG. 3 is a schematic diagram of an optimization chain in which the invention (GASA) is illustrated.

FIG. 4 is a schematic diagram of a GASA Partial Substring Crossover

FIG. 5 is a schematic diagram of an example of a GASA Near Neighbor Attribute Matrix (NNAM) prior to being recomputed by the GASA MatGen module.

FIG. 6 is a schematic diagram of an example of a GASA Near Neighbor Attribute Matrix (NNAM) being recomputed for resource number 1.

FIG. 7 is a schematic diagram of an Example of Near Neighbor Attribute Matrix (NNAM) After Rebuilding According to Fitness.

Current Task for Resource 1=18.

FIG. 8 is a schematic diagram of a Probability Selection Curve For Selecting The next Task From The NNAM

DESCRIPTION OF THE PREFERRED EMBODIMENTS

The detailed description of this invention is explained by the text, the FIGURES, and the enumerated process description given below. All functions of the invention described below are intended to be implemented in computing software and hardware. The descriptive names employed in the description of this invention (HSM, GASA, HRepro, NNAM, MatGen, FHA, PopGen) are for descriptive purposes only and are not intended to limit the scope of the claims.

FIG. 1 is a schematic view of the classic (or simple) GA (GA) that the invention improves upon. At initialization, the GA initializes the population (trial solutions) in a random manner. Following initialization the GA approach relies on crossover, recombination and mutation alone for reproduction to generate a new population for solving a scheduling or optimization problem.

The encoding of the problem into chromosomes is critical for proper optimization. The encoding of Syswerda referenced above is an example of GA encoding. An example of the encoding used by this invention is shown in the figures FIG. 2A through FIG. 2C, whereby this invention supports variable number of resource assignments to tasks. FIG. 2A illustrates a chromosome of length N with all resources that can be assigned is assigned. FIG. 2B illustrates the same problem encoding of a chromosome of length N−1 where a lesser number of resources have been assigned to a particular task. It is noted that this chromosome may or may not lead to a lower cost solution, depending on the costs of employing the variable number of resources. FIG. 2C shows another way of encoding an N−1 length chromosome by using NULL resources to effectively lessen the chromosome length. A NULL resource is one that may be assigned to a task yet has no cost effect on the resulting fitness calculation. This invention claims both methods.

FIG. 3 is one preferred functional embodiment of the invention. In general functional terms, the invention modifies and improves upon the CGA approach by replacing the encoding method and GA Reproduction function with the five Genetic Adaptive Search Agent (GASA) functions as shown inside the dashed area of the figure.

As the optimization process proceeds, the GASA itself evolves by using statistics from the solution fitness calculation history (the FHA) to build profiles and trends that continuously narrow the solution search space to better (more fit) areas. Note that the genetic reproduction process itself also attempts to narrow the search space. However, the reproduction process works only on whole and partial solutions (genes and chromosomes), and the recombination of constrained solutions into new solutions often violates constraints, thus rendering recombination alone as unreliable as an effective optimization search method.

The practice of this technology may be considered and described on a number of different technical and semantic levels. Among these descriptions, in which individual terms may be further and later elucidated are:

A method of schedule and resource selection optimization. The method is based on an operation of at least one genetic algorithm. The method may comprise:

employing a single variable length chromosome comprising genes that consist essentially of a value for a resource assigned and a relative order of use for the resource, without requiring a deterministic scheduling procedure;

determining fitness of an order of at least a pair of genes in relation to another pair of genes by rating criteria associated with the order of associated genes;

using a continuous sub-string crossover method of reproduction for creating sub-strings of genes coupled with a procedure that effects a composite population creation and reproduction process;

the procedure comprising creating a population optimization history for the population creation and reproduction process, eliminating at least some less optimum populations in a progression of the reproduction process; and defining at least one optimum schedule and resource selection based upon a combination of optimized populations that have been reproduced.

2. A method of schedule and resource selection optimization comprising:

identifying a multiplicity of individual intermediate events that can be compiled into a completed event;

assigning resource value to each of the intermediate events;

determining fitness or value for sets of at least two intermediate events for at least some of the intermediate events based upon the assigned resource value;

determining maximum fitness of maximum resource value among individual sets of intermediate events and identifying at least one individual set having maximum resource value as a preferred superset and identifying individual events not included in the superset as a residual event;

determining fitness or resource value for second sets of residual events and the at least one superset;

determining maximum fitness of maximum resource value among individual second sets and identifying at least one further individual set having maximum resource value as a second preferred superset and identifying individual events and any supersets not included in the second preferred superset as a second residual event thereby reducing total number of individual events to be considered in subsequent actions determining maximum fitness or maximum resource value among further combinations of individual events, individual sets, supersets; and preferred supersets to advance identification of an optimized schedule and resource selection.

This method may, by way of non-limited examples expanded upon elsewhere herein, may select the resource value from the group consisting of time, cost, performance quality, and asset utilization, or from the group consisting of time, cost and asset utilization. The method may be used where the event comprises only one class of event selected from the group consisting of a) travel between individual activities, b) steps in a manufacturing process, c) steps in a building or construction process, d) steps in a sequence of chemical synthesis, and e) travel between individual locations.

An alternative way of describing this technology would be as a method performed on a computer by directly encoding resources to task assignments such that the assignments may be optimized according to at least one criteria. The method might comprise:

a) providing a first list of tasks having lengths that may be fixed or variable, and the order of which tasks is not permutable;

b) assigning to each task, a fixed or variable length list of resource types;

c) providing for each resource type a fixed or variable length second list of resource instances assigned to the task;

d) for each resource type, constructing a variable length third list consisting of a dual value tuple having at least a first value and a second value, the first value representing the resource to be assigned to the task and the second value representing the relative order of resource assignment for the resource being assigned to the task;

e) defining as a gene, each combination of resource type third list and the tuple list of resources of each type and the resource usage order;

f) providing for each task and resource type a fourth list of the minimum number of resource instances required for that resource type and task;

g) creating for each task a fifth list of the maximum number of resource instances required for that resource type and task;

h) creating for each task a sixth list of the minimum and maximum time execution constraints;

i) creating for each resource a seventh list of the minimum and maximum time availability and physical load constraints;

j) this seventh list of tasks with each task having a required third list of resource types and the resource types having a variable length tuple list of assigned resources and their order of usage (gene) to create a virtual chromosome.

Another way of describing he technology is as a computer method of directly encoding resources to tasks assignments such that the assignments may be optimized (e.g., minimum dollar cost, minimum time used, maximum efficiency of any resource, etc.), the method comprising:

a) providing a list of tasks the individual performance of which tasks may be fixed or variable, and the order of which is not permutable;

b) for each task, a fixed or variable performance list of resource types to be assigned to the task;

c) for each resource type a fixed or variable performance list of resource instances of that type that may be assigned to the task;

d) for each resource type, a variable performance list consisting of a dual value tuple, the first value representing the resource to be assigned to the task and, the second value representing the relative order of resource assignment for the resource being assigned to the task;

e) the resource type list and the tuple list of resources of each type and the resource usage order together are for the purposes of this method is defined as a gene;

f) for each task and resource type a list of the minimum number of resource instances required for that resource type and task;

g) for each task a list of the maximum number of resource instances required for that resource type and task;

h) for each task a list of the minimum and maximum time execution constraints;

i) for each resource a list of the minimum and maximum a) time availability, b) cost, and/or c) physical load constraints;

j) this list of tasks with each task having a required list of resource types and the resource types having a variable performance tuple list of assigned resources and their order of gene usage is defined as a chromosome; and selected a chromosone having optimal resource allocation and performing that chromosome.

Such a computer method of generating new chromosomes described above for completing partially populated chromosomes as partial chromosone solutions, as by combining genes to chromosomes to form Genetically Adapted Search Agents (GASA), may comprise:

a) establishing a fixed length file representing best chromosomal solutions to date, named the Fitness History Archive (FHA), is the FHA being updated regularly to contain most fit/best new chromosomes found;

b) stochastically selecting new genes by partial means of a Near Neighbor Attribute Matrix (the NNAM) with one NNAM column for each resource type with one NNAM column for each given task, each given task being a current position of the resource, the NNAM representing an ordered prediction of the genes that are most likely to improve the resulting chromosome fitness;

c) a method of generating the NNAM from the FHA named the MatGen that creates a new NNAM that weights each NNAM entry for each task for each resource type in such a manner that the NNAM entries are ordered such that the task entries are most likely to increase the fitness of the new chromosome;

d) the GASA containing a method of Heuristic Search Modes (HSM) method to search the NNAM to greatly help speed the search for new solutions;

e) by a Hybrid Reproduction method (Hrepro), stochastically selecting from 0 to N chromosomes, N being a random number different for each new chromosome, or ordered sub strings (i.e., a partial ordered list within the gene) of gene sequences from said N population members and combining each new chromosone, and/or ordered substring into strings of genes (crossover) so that inconsistent sequences are not allowed;

f) completing reproduction (named PopGen), by specifying genes not specified in Hypro due to conflict, (they are specified from the NNAM by using the HSM);

g) using a set of search agents, one for each resource that may be assigned, to stochastically search the NNAM to perform optimum gene selection.

Such a computer method of chromosome evaluation may be used to compute the fitness of each chromosome consistent with the constraints listed directly above.

The term "tuple" in programming languages, such as LISP, Python, Linda, and others, is an ordered set of values. The separator for each value is often a comma (depending on the rules of the particular language). Common uses for the tuple as a data type are (1) for passing a string of parameters from one program to another, and (2) representing a set of value attributes in a relational database. In some languages, tuples can be nested within other tuples within parentheses or brackets or other delimiters. Tuples can contain a mixture of other data types. An example of a tuple that emphasizes the different data types that may exist within a tuple data type is:

17,*,2.49,Seven

The above example is sometimes referred to as a 4-tuple, since it contains four values. An n-tuple would be one with an indeterminate or unspecified number of values. The term originated as an abstraction of the sequence: single, double, triple, quadruple, quintuple, . . . n-tuple. Tuple is used in abstract mathematics to denote a multidimensional coordinate system.

Now the GASA five items inside the dashed box of FIG. 3 are each described in detail:

1) FHA—A Fitness History Archive used to store the past history of the best optimization solutions (chromosomes). This list is limited to a small number, usually less than 100 solutions. Each solution consists of each resource's assignments to tasks, and the order in which the resource was assigned (genes).

2) MatGen—A software module that generates the NNAM from the FHA according to description of the NNAM.

3) NNAM—A genetically adapted Near-Neighbor Attribute Matrix of ordered task preferences for each resource type. By preference is meant that when a resource (as represented by its agent) is looking for its next assignment to an available task (performed in PopGen), the resource (agent) notes its current task assignment, its current assignment sequence number, and then gets its next assignment by stochastically accessing its NNAM list. The tasks on the NNMA lists are ordered by likelihood of providing a good score to the solution fitness. The NNMA evolves as does the FHA.

The NNAM is computed by processing the FHA to create each resource's preferred sequence of task selections. Each sequential selection (candidate task) is weighted by the fitness value of the FHA solutions being analyzed. After all FHA solutions have been so analyzed, the results are sorted so that the NNAM sequences are ordered in terms of those tasks that resulted in the greatest composite fitness values from the FHA. FIGS. 5, 6, and 7 illustrate an example of the NNAM. FIG. 5 shows an initial NNAM prior to processing by MatGen.

This initial NNAM may be created randomly or by any other manner. FIG. 6 shows an example of calculating the NNAM for one task number, 18. Note that task 32 received the greatest value, the summation of fitnesses, from the FHA analysis when being selected for task 18. After sorting, task 32 is placed on top of the list for NNAM task 18, resource 1. This means that task 32 will be given a higher probability of selection next time resource 1 is at task 18. In other words, as each task (agent) begins its search for its next task, it starts by considering the task that gave it the best previous results (from the FHA).

4) HRepro—A Hybrid Reproduction module that genetically recombines previous solutions to form new GASA solutions. This module uses continuous ordered partial substring crossover as illustrated in FIG. 4. For each new chromosome, the chromosome's genes are formed from stochastic selection of genes from 0 to N chromosomes, N being a random number different for each new chromosome. These stochastically selected genes are ordered sub strings (i.e., a partial ordered list within the gene) of gene sequences from said N population members that are combined into longer strings of genes (crossover) so that inconsistent sequences are not allowed. Not all genes may be specified by HRepro if enough conflicts from the N chromosome genes preclude full gene specification. In these cases the genes are left unspecified and are filled in PopGen.

5) PopGen—A software module that generates new trial Population members (chromosomes) from NNAM, HSM, HRepro, and the constraints. If the HRepro has fully specified all the chromosome genes, the PopGen checks the constraints, and if the constraints have been satisfied, the new chromosome is unchanged. If the constraints are not satisfied, the PopGen deletes the gene assignments from HRepro and fills in the gene assignments from the NNAM using the Heuristic Search Modes (HSM). One HSM heuristic is shown in FIG. 8. In this mode, the next task from the current task's NNAM starting position is selected randomly according to the curve shown. Note that the higher valued tasks close to the top of the NNAM list are more likely to be selected by the resource/agent. Other Modes can be used according to the application specifics.

| COMPARISONS OF THIS INVENTION AND PRIOR ART | | |
|---|---|---|
| Present System | Prior Art | Comments |
| 1) A method of schedule and resource selection optimization based on genetic algorithms. | Many prior art methods for schedule optimization using genetic or evolutionary algorithms exist. | The novelty is in the way the herein described genetic algorithm is implemented. |
| 2) A method of encoding the resource assignment and scheduling problem such that variable numbers of resources may be assigned to each individual task. | This is done by multiple chromosomes that greatly enlarge the search space or by a single chromosome of tasks that are permuted and evaluated by a deterministic procedure. U.S. Pat. No. 5,319,781 by Syswerda was partially granted because of its encoding procedure. All known patents and prior art describe constant length chromosomes. | The present concept is to employ a single variable length chromosome consisting of genes that consist of a value for the resource assigned, and its relative order of use. The current concept does not require a deterministic scheduling procedure. |
| 3) The solutions are evaluated and scored for fitness. | This is a key component of genetic algorithms. | Fitness is something determined by the specifics of the problem, e.g., cost of operating the schedule, or the number of tasks accomplished by the schedule, or the degree to which the schedule meets subjective priority criteria, etc. |
| 4) A new population, generally including better solutions, is created by some mechanism of breeding referred to as reproduction. Mutation is not required as the stochastic method (GASA) of defining new chromosomes replaces the need for mutation. | This may be practiced in genetic algorithms and there is some choice of breeding methods. | The proposed system uses continuous sub string crossover method of reproduction coupled with a new procedure that together form a composite reproduction process. |
| 5) Creation of schedule and resource assignment solutions is subject to constraints so that the resulting schedules are valid or legal, the constraints being applied during population generation. | This is a normal requirement for scheduling systems, it being preferred to generate only valid solutions instead of separating valid and invalid solutions at the fitness evaluation stage. U.S. Pat. No. | The constraints here are those that must be met in order to have a valid schedule, e.g., a worker (i.e., a resource) has the necessary skill to complete a task, or the parts to complete a task must be |

COMPARISONS OF THIS INVENTION AND PRIOR ART

| Present System | Prior Art | Comments |
|---|---|---|
| | 5,848,403 states that it is preferable to eliminate invalid solutions at the time of creation but includes the possibility of later elimination: "Genomes which encode schedules which don't meet hard constraints are unfit. Therefore, unfit genomes should be removed once they are detected, or preferably before they are created.". U.S. Pat. No. 5,319,781 teaches rejection of solutions that do not meet hard constraints (i.e., are invalid) at the time of solution creation and prior to fitness evaluation (i.e. before soft constraints are taken into account). (Here hard constraints are those that must absolutely be met while soft constraints represent merely a preference.) | available, or a task that must be done beforehand has been completed, or same single resource is not required for two tasks simultaneously, etc. The proposed invention document shows (FIG. 1) the conventional approach as applying constraints at the fitness evaluation stage while the proposed invention (FIG. 2) applies constraints at the population generation stage. However, the distinction between FIGS. 1 and 2 as to the point at which constraints are applied is of interest in view of U.S. Pat. No. 5,848,403 and 5,319,781. |
| 6) Creation of the next population of solutions occurs via two distinct branches that combine their output via a module termed PopGen. | Normally a new population is created via a single pathway using one or more conventional means of breeding a new population. | During reproduction known scheduling methods may use additional information beyond simply the existing population and the fitness scores of the individual solutions forming that population. However (see below) the novelty of the proposed invention lies in part in its use of the population optimization history for the population creation process. |
| 7) The first branch for creating the next population uses the HRepro (Hybrid Reproduction) module, which only uses crossover, only using continuous sub strings from stochastically selected multiple parents with no conflicts. | The conventional art uses different crossover because of the single value nature of the conventional chromosomes. Also, conventional art uses mutation. | The proposed invention document makes the point that the invention is distinct from classical methods in using continuous sub string crossover with no mutation. HRepro makes no new assignments to the population if any genes or chromosomes are invalidated. For example, U.S. Pat. 5,848,403 teaches the use of resource capability indicating components and task constraint indicating components (conveniently implemented as bitmasks) for the purpose of explicitly and efficiently excluding invalid solutions from the new population. It is, therefore, not novel to exclude invalid solutions arrived at by conventional algorithms. |
| 8) The second branch for creating the next population uses the MatGen module to create the NNMA (Near Neighbor Attribute Matrix) which is built using information in the FHA | It is known in the art to use ordered or ranked lists to create new solution populations based on this ordering or ranking in genetic algorithms used for schedule determination. | Simply choosing a candidate solution from a list that has been ordered or ranked in some way is not considered novel. Using a ranking that is based on the previous optimization |

COMPARISONS OF THIS INVENTION AND PRIOR ART

| Present System | Prior Art | Comments |
| --- | --- | --- |
| (Fitness History Archive). The NNAM contains, by resource, for every task occurring in a particular sequence, a list of tasks cont.) ordered by probability of providing a good solution fitness score. The ordering of tasks is derived from the previously determined solution fitness score retrieved from the FHA, which also includes information about how each resource was assigned to a task and in what order it was assigned. Tasks that gave high scores in previous solutions have a higher chance of being included in a new solution created in this branch of the algorithm. | Thus U.S. Pat. No. 5,848,403 teaches the use of a resource bid list wherein resources are ranked according to the cost for using the resource to accomplish a particular task and the optimal bid is chosen for the next solution. | history is, however, believed to be novel. |
| 9) Solutions from the two branches are combined into a single population by means of the PopGen module. If all the genes were specified by the HRepro module, then no new operations are performed in PopGen. However, if genes have been left unspecified, then the PopGen modules uses the NNAM and the HSM to stochastically make new genes. | Conventional approaches use a single reproduction branch, possibly using ancillary information. In addition, if new genes are to be added to chromosomes, then deterministic procedures are used (e.g. U.S. Pat. No. 5,319,781 by Syswerda). | The combination of solution candidates from two distinct sources - those from conventional reproduction and those derived from the past optimization history - are novel in itself. That is, irrespective of whether optimization history is used for one of the sources or not. |

The following discussion will be used as an example of a specific procedure for practicing the generic concepts described herein. A situation is considered where it is desired to optimize the process of painting of several structures, with each structure having times constraints dictating allowable time start and time end. A list of the structure locations, which will be considered the generic task (GT) and noted as ($L_1$, $L_2$, ... $L_n$) and constraints (These are considered as Task Limitations) (TL, such as scaffolding requirements, paint volumes, scaffolding installer availability, special applicators, permit requirements, bonding requirements, insurance requirements, etc.) are given. Also, a list of available painters, another set of Operative Limitations on the GT ($P_1$, $P_2$, ... $P_n$) is given with time availability constraints, still another OL on the GT (a calendar of available time slots for each painter is provided as $tP_1$, $tP_2$, ... $tP_n$), and hourly cost rates given for each painter, yet another OL on the GT ($cP_1$, $cP_2$, ... $cP_n$). For each structure a minimum and maximum number of painters that may be applied to the structure may be given ($Range_nL_1$, $Range_nL_2$, ... $Range_nL_n$).

These lists are input to the processor executing code and software according to the practice of the generic technology described herein and the optimization process proceeds by computer execution. The invention genetically varies the individual painters, their order of painting, and the numbers of individual painters, for each structure. The program may set analytical bases on costs, time to completion, and/or combinations of these and other determinable measurements. The costs are computed for each combination of variables consisting of all factors that may add to cost, including at least paint costs, painting costs, labor time costs and travel time costs. The lowest cost or otherwise most favorable or exclusively favorable solutions are entered into the Fitness History archive (FHA) and the most costly or impossible solutions are excluded. By exclusively favorable or impossible solutions would be situations where the time needed for painting a specific location L6, would require 7 painters, and the only time frame where 7 painters were available was June 12-June 23. This would define a unique and exclusive 'only' solution for scheduling, independent of rational cost restraints or relative costs, for one of the GT. This solution element or chromosome would likely become a required chromosome towards the final solution and so entered into the FHA. The realm or group from which additional analyses, usually or often in combinations of GTs is then put through a similar process, with certain inefficient or impossible chromosomes eliminated from future consideration. An impossible GT configuration or chromosome might be, for example, a request to have a particular location, L3, painted before June 7, in less than 5 days, with fewer than 5 painters. Input parameters might indicate that the structure may not be accessible for painting until June 5 at the earliest, or that it would require 7 painters 5 days to complete the task. That entire GT would be excluded as impossible. An uneconomic elimination of the GT chromosome might be painting L3 for 5 days with 7 painters from June 30-July 6, where costs would be increased by holiday pay (for the $4^{th}$ of July weekend), such that painting over that period would be 25% higher than any other time frame. That particular combination of GT and all associated OLs would not be used in the further analysis and solution of the problem. Note that if a chromosome specifies fewer painters for some structures, the chromosome length is effectively shortened for that structure. The optimization program would then proceed by eliminating the impossible chromosomes and eliminating at least some of the worst economically inefficient chromosomes and then continuing analysis. The initial analysis of the totality of the tasks might begin by analyzing combinations of GTs, such as the entire series of combinations of L1 with each other location (e.g., individually each one of $L_2, \ldots L_n$) to form a sub-GT analytic basis. This can be initially done, or done after individual GTs have been eliminated.

As the optimization proceeds using the initial optimized first step analysis chromosomes, the FHA is processed to create the Near-Neighbor Attribute Matrix (NNAM). It must be noted that "near" is not exclusively to be considered as a physical distance basis of analysis, as time may also be so considered. The NNAM may consist of the individual preferred chromosomes or the preferred sets of GTs chromosomes resulting from the first optimizing analysis. This process eliminates either individual potential or theoretic chromosomes or parameter set chromosomes (a chromosome based upon analysis of multiple GTs, as in consecutive GTs or pairs of GTs that are theoretically possible.

Next in an analytic progression under this technology, new painting assignment solutions (chromosomes) are created from the remaining potential or theoretic chromosomes that have not been eliminated. First, the HRepro stochastically selects several existing solutions to create each new solution. For example, from one solution, painter number 2 (P2) is assigned structures 3,5,9; to be painted in order 1,2,3. From another chromosome (solution), P2 is assigned structures 6,8 in order, 6,7. In like manner, other painters are assigned non competing structures to paint for the new chromosome.

Next, P2 is proccessed by the PopGen module. In PopGen, the NNAM and the HSM assign P2 to paint structures 8 then 10, between painting structures 3,5,9 and 6,8. The NNAM has done so because it predicts this will result in a better fitness (low cost). As a result, P2 paints structures: 3,5,9,8,10,6,8; in order 1,2,3,4,5,6,7. Finally, this new chromosome is evaluated to ensure that no constraints are violated.

In like manner, the invention continually creates new solutions (chromosomes) to minimize the costs of painting all the structures.

What is claimed:

1. A computer method of generating a list of new chromosomes from an initial list of chromosomes by employing a crossover method to speed up the convergence of the optimizing procedure to better or more fit solutions; each chromosome having multi-valued genes and representing a solution to a process being optimized; the chromosomes being operated on by an optimizing procedure to increase the fitness of the chromosomes; the steps of the method comprising:
   a) defining a list of process tasks that are to be performed;
   b) providing a list of resources to be used in the performance of the process tasks;
   c) generating an initial list of chromosomes with each chromosome consisting of a list of gene groups, wherein at least some of the gene groups are assigned to at least a single one of the process tasks, and wherein each gene group consists of one or more genes, and each gene within at least some of the gene groups consists of a resource from the list of resources and an order of resource usage to perform a process task to which that resource was assigned;
   d) evaluating fitness of each of the chromosomes from the generated list for executing the process tasks a fitness value to the chromosome;
   e) creating a new list of partially filled chromosomes from the generated list of c) by:
      i) stochastically selecting two or more chromosomes from the generated list of c);
      ii) stochastically selecting a resource from each chromosome in the generated list of c) and an ordered subset of this resource's ordered sequence of execution, wherein a contiguous subset is defined as where when a sequence execution is ordered 0 to J, with J+1 assignments in the chromosome with each task being executed in the order 0 to J by the resource, an ordered subset is a set of hierarchal values, with positions in the chromosome of the ordered subset being contiguous or not contiguous mathematically,
      iii) relabeling the ordered subset to a base relative order, changing the order from an original order in the list to a relabeled order to generate an output;
   f) constructing a new chromosome by joining outputs of e) iii) and processing conflicts between ordered subsets that each refer to a same chromosomal position by randomly selecting one of the ordered subsets and dropping that selected ordered subset or retaining that ordered subset and dropping a conflicting ordered subset;
   g) completing assignment of partially filled chromosomes by employing a next series of steps with Adapted Search Agents, the Adapted Search Agents comprising the steps of;
      i) building a fixed length file representing a best chromosomal solution to date as determined by the fitness values from d), this file being a Fitness History Archive, which is updated during this step g) to contain most fit/best new chromosomes found by applying processing of steps d) f) and/or g); and
   h) performing at least one process task from the best chromosomal solution to date;
   wherein individual tasks is performed based on the computer method and the individual task includes at least one step selected from the group consisting of a) performing a chemical synthetic procedure; b) performing a manufacturing process to produce a finished product; and c) performing a construction project.

2. The method of claim 1 wherein individual tasks include at least one step selected from the group consisting of a) moving persons or objects between multiple destinations, b) performing a chemical synthetic procedure; and c) performing a manufacturing process to produce a finished product.

3. The method of claim 1 further comprising the steps of building a Near Neighbor Attribute Matrix comprised of;
   1) one Near Neighbor Attribute Matrix column for each resource instance named in a resource instance list,
   2) for each resource instance of the resource instance list, one Near Neighbor Attribute Matrix column which is a current task assignment of a resource named in a current assignment task list,
   3) for each current assignment task in the current assignment task list, an ordered list of preferred next assignment tasks with order in the ordered list representing a highest potential fitness for the gene if selected; and
following step 3) by the steps of populating the Near Neighbor Attribute Matrix from the Fitness History Archive with a Matrix Generator that creates a new Near Neighbor Attribute Matrix that weights each Near Neighbor Attribute Matrix entry for each task for each resource so that the Near Neighbor Attribute Matrix entries are ordered so that the task entries are most likely to increase the fitness of the new chromosome.

4. The method of claim 3 wherein the Near Neighbor Attribute Matrix is sorted as to preference to increasing the fitness of the chromosome.

5. The method of claim 4 wherein each chromosome in g) is filled by either stochastically assigning new resources or sequentially accessing the Near Neighbor Attribute Matrix preferred next assignment tasks list to find a best fit task for the resource by using the steps of e) i), ii) and iii), which are repeated until all unassigned resources and their order of execution are assigned for each chromosome.

6. The method of claim 5 comprising further steps of creating a list of Resource Current Assignment that is initialized to zero and is used to track each resource's current order assignment as each gene's resource and resource order are assigned.

7. The method of claim 6 wherein the list of resources is stochastically accessed to select a resource.

8. The method of claim 7 wherein, if the selected resource has not been previously assigned in building a current chromosome, then that selected resource is assigned as 0 in the Resource Current Assignment and the method stochastically assigns the resource to a previously unassigned gene if the gene is not in the middle or the end of a relatively ordered subset sequence in c) e) or f).

9. The method of claim 8 wherein, if the gene is at the beginning of a gene fragment or an unassigned gene not in an ordered subset, then that gene is assigned to the resource.

10. The method of claim 9 wherein if the resource has been assigned before, then the Near Neighbor Attribute Matrix is accessed using the resource and its current Resource Current Assignment value to select a next unassigned task to be assigned to the resource.

11. The method of claim 10 wherein, a procedure is performed wherein if the task has already been assigned, a next item down in the Near Neighbor Attribute Matrix list is selected to try the next task, repeating this procedure until a highest fit unassigned new task is found, and then assigning the highest fit unassigned task to the resource and its resource order gene value is to the Resource Center assignment value+1 and the Resource Center Assignment value is reset.

12. A method of performing optimizing a building construction process by iteratively applying the method of claim 11 wherein at least some resources are selected from the group consisting of transporting personnel, transporting material, and order of building section construction.

13. A method of product manufacture comprising iteratively applying the method of claim 11 on a processor to tasks underlying the product manufacture and then manufacturing the product.

14. A method of chemical synthetic steps comprising iteratively applying the method of claim 11 to synthetic steps in the chemical synthesis.

15. A computer method of generating a list of new chromosomes from an initial list of chromosomes by employing a crossover method to speed up the convergence of the optimizing procedure to better or more fit solutions; each chromosome having multi-valued genes and representing a solution to a process being optimized; the chromosomes being operated on by an optimizing procedure to increase the fitness of the chromosomes; the steps of the method comprising:

a) defining a list of process tasks that are to be performed;
b) providing a list of resources to be used in the performance of the process tasks;
c) generating an initial list of chromosomes with each chromosome consisting of a list of gene groups, wherein at least some of the gene groups are assigned to at least a single one of the process tasks, and wherein each gene group consists of one or more genes, and each gene within at least some of the gene groups consists of a resource from the list of resources and an order of resource usage to perform a process task to which that resource was assigned;
d) evaluating fitness of each of the chromosomes from the generated list for executing the process tasks a fitness value to the chromosome;
e) creating a new list of partially filled chromosomes from the generated list of c) by:
   i) stochastically selecting two or more chromosomes from the generated list of c);
   ii) stochastically selecting a resource from each chromosome in the generated list of c) and an ordered subset of this resource's ordered sequence of execution, wherein a contiguous subset is defined as where when a sequence execution is ordered 0 to J, with J+1 assignments in the chromosome with each task being executed in the order 0 to J by the resource, an ordered subset is a set of hierarchal values, with positions in the chromosome of the ordered subset being contiguous or not contiguous mathematically,
   iii) relabeling the ordered subset to a base relative order, changing the order from an original order in the list to a relabeled order to generate an output;
f) constructing a new chromosome by joining outputs of e) iii) and processing conflicts between ordered subsets that each refer to a same chromosomal position by randomly selecting one of the ordered subsets and dropping that selected ordered subset or retaining that ordered subset and dropping a conflicting ordered subset;
g) completing assignment of partially filled chromosomes by employing a next series of steps with Adapted Search Agents, the Adapted Search Agents comprising the steps of;
   i) building a fixed length file representing a best chromosomal solution to date as determined by the fitness values from d), this file being a Fitness History Archive, which is updated during this step g) to contain most fit/best new chromosomes found by applying processing of steps d) f) and/or g); and
h) performing at least one process task from the best chromosomal solution to date;
wherein individual tasks is performed based on the computer method and the individual task includes at least one step selected from the group consisting of a) moving persons or objects between multiple destinations, b) performing a chemical synthetic procedure, c) performing a manufacturing process to produce a finished product; and d) performing a construction project.

16. A method of delivering goods in a delivery process by iteratively applying the method of claim 15 using pick-up of materials, or delivery of materials and available transport as tasks and resources.

* * * * *